United States Patent
Henry et al.

(10) Patent No.: US 11,923,937 B2
(45) Date of Patent: Mar. 5, 2024

(54) REDUCING SPURIOUS BEAMFORMING IN HIGH DENSITY ENVIRONMENTS

(71) Applicant: Cisco Technology, Inc., San Jose, CA (US)

(72) Inventors: Jerome Henry, Pittsboro, NC (US); Robert E. Barton, Richmond (CA); Matthew A. Silverman, Shaker Heights, OH (US); Pooya Monajemi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 190 days.

(21) Appl. No.: 17/332,670

(22) Filed: May 27, 2021

(65) Prior Publication Data

US 2022/0385346 A1    Dec. 1, 2022

(51) Int. Cl.
*H04B 7/06* (2006.01)
*H04W 36/08* (2009.01)
*H04W 52/30* (2009.01)

(52) U.S. Cl.
CPC .......... *H04B 7/0617* (2013.01); *H04W 36/08* (2013.01); *H04W 52/30* (2013.01)

(58) Field of Classification Search
CPC .... H04B 7/0617; H04B 7/0695; H04B 7/088; H04B 7/024; H04B 17/336; H04W 36/08; H04W 52/30
See application file for complete search history.

(56) References Cited

U.S. PATENT DOCUMENTS

| | | | |
|---|---|---|---|
| 2014/0256322 A1* | 9/2014 | Zhou | H04J 11/005 455/436 |
| 2014/0334473 A1 | 11/2014 | Zhang et al. | |
| 2015/0131593 A1 | 5/2015 | Stager et al. | |
| 2016/0095102 A1 | 3/2016 | Yu et al. | |
| 2016/0218787 A1 | 7/2016 | Zhang | |
| 2016/0249366 A1 | 8/2016 | Seok | |
| 2017/0373739 A1* | 12/2017 | Guo | H04B 7/0617 |
| 2018/0048411 A1* | 2/2018 | Allen | H04J 11/003 |
| 2018/0110076 A1* | 4/2018 | Ko | H04W 74/006 |
| 2018/0219659 A1* | 8/2018 | Wernersson | H04B 7/0617 |

(Continued)

FOREIGN PATENT DOCUMENTS

EP    3585101 A1    12/2019

OTHER PUBLICATIONS

PCT, Notification of Transmittal of The International Search Report and The Written Opinion of The International Searching Authority, or The Declaration for Application PCT/US2022/072356 dated Aug. 26, 2022.

*Primary Examiner* — Ian N Moore
*Assistant Examiner* — Sun Jong Kim
(74) *Attorney, Agent, or Firm* — Patterson + Sheridan, LLP

(57) ABSTRACT

Spurious beamforming in high density environments can be reduced via transmitting a first signal from a first Access Point (AP) to a first endpoint associated with the first AP via a first beamforming arrangement; in response to identifying that the first beamforming arrangement is pollutive to a second endpoint associated with a second AP: deprecating the first beamforming arrangement; and transmitting a second signal from the first AP to the first endpoint via a second beamforming arrangement, different from the first beamforming arrangement.

20 Claims, 8 Drawing Sheets

(56) References Cited

U.S. PATENT DOCUMENTS

| | | |
|---|---|---|
| 2019/0124521 A1* | 4/2019 | Yang ..................... H04W 60/04 |
| 2019/0320336 A1* | 10/2019 | Takano ................. H04W 16/28 |
| 2019/0380082 A1* | 12/2019 | Kim .................. H04W 36/0058 |
| 2020/0059834 A1* | 2/2020 | Kim ........................ H04W 4/80 |
| 2020/0077275 A1 | 3/2020 | Apostolopoulos et al. |
| 2020/0162924 A1* | 5/2020 | Desai .................. H04W 12/108 |
| 2020/0396621 A1 | 12/2020 | Park et al. |
| 2021/0051495 A1 | 2/2021 | Gupta et al. |
| 2021/0100017 A1 | 4/2021 | Chendamarai Kannan et al. |
| 2022/0286175 A1* | 9/2022 | Matsumura .......... H04B 7/0695 |
| 2022/0311487 A1* | 9/2022 | Abedini ............... H04B 7/0617 |

* cited by examiner

REDUCING SPURIOUS BEAMFORMING IN HIGH DENSITY ENVIRONMENTS

TECHNICAL FIELD

Embodiments presented in this disclosure generally relate to wireless signaling. More specifically, embodiments disclosed herein relate to directional beamforming and the management thereof.

BACKGROUND

Beamforming is a technique that focuses a wireless signal to a specific receiving device, rather than having the signal spread evenly in all directions from a broadcast antenna. The resulting beam-formed connection focuses the antenna's power in a specific direction, allowing for faster connections and lower spread of the signal to other regions covered by the transmitter. However, when multiple transmitting devices are in an area, the beam-formed transmissions may interfere with other transmitters or receivers in unintended ways, for example, extending past the normal broadcast range of a first transmitter to be received by a receiver associated with a second transmitter.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
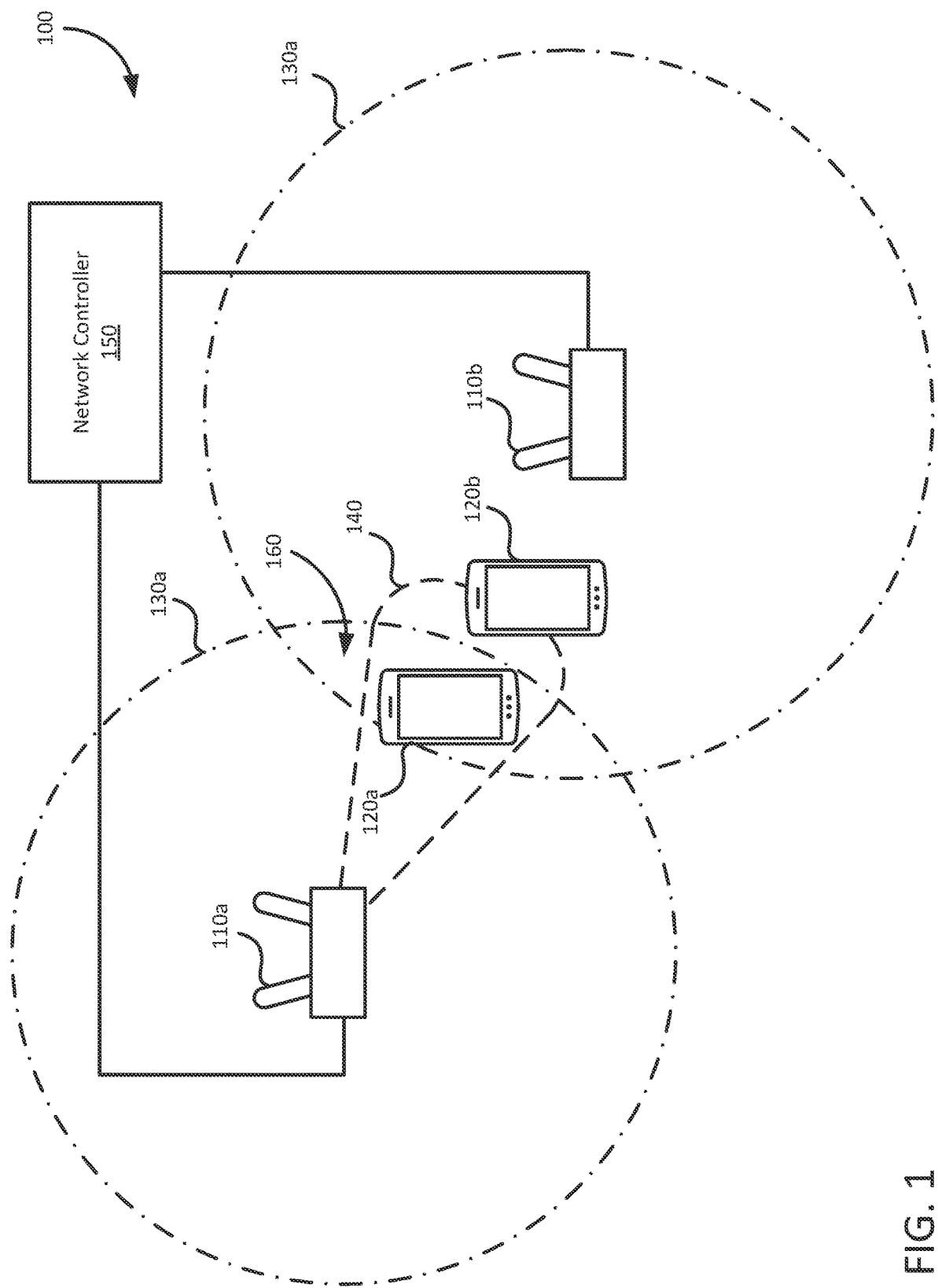
FIG. 1 illustrates a networking environment 100, according to embodiments of the present disclosure.

One embodiment presented in this disclosure is a method comprising: transmitting a first signal from a first Access Point (AP) to a first endpoint associated with the first AP via a first beamforming arrangement; in response to identifying that the first beamforming arrangement is pollutive to a second endpoint associated with a second AP: deprecating the first beamforming arrangement; and transmitting a second signal from the first AP to the first endpoint via a second beamforming arrangement, different from the first beamforming arrangement.

One embodiment presented in this disclosure is an access point, comprising: a processor; and a memory including instructions, that when executed by the processor perform an operation comprising: transmitting a first signal to a first endpoint that is associated with the access point via a first beamforming arrangement; in response to identifying that the first beamforming arrangement is pollutive to a second endpoint not associated with the access point: deprecating the first beamforming arrangement; and transmitting a second signal from the access point to the first endpoint via a second beamforming arrangement.

One embodiment presented in this disclosure is a method comprising: transmitting a first signal from a first Access Point (AP) to a first endpoint associated with the first AP via a first beamforming arrangement; in response to identifying that the first beamforming arrangement is pollutive to a second endpoint associated with a second AP: transmitting a second signal from the first AP to the first endpoint via a second beamforming arrangement; and in response to identifying that a first pollutive effect of the first beamforming arrangement is greater than a second pollutive effect of the second beamforming arrangement, deprecating the first beamforming arrangement.

Example Embodiments

The present disclosure detects when beamforming by a first transmitter is pollutive or otherwise causes interface to a receiver associated with a second transmitter. The present disclosure also provides for mitigating and preventative actions once a pollutive beamforming is detected. The present disclosure explores several different and complementary ways to detect and react to a pollutive beamforming arrangement.

Accordingly, by implementing the methods of the present disclosure, a wireless network operation can limit the effect of pollutive beamforming transmissions in a high density network (e.g., using IEEE 802.11ax or 802.11be communications standards). In various embodiments, the present disclosure uses neighbor detection reports to discard pollutive beamforming schemes that can otherwise go undetected by a transmitter. Additionally, the described methods increase the efficiency of high density networks by allowing beamforming to account for the reality of indoor environments, such as beams that do not produce perfectly simulated signal lobes do to multipath reflections, transient objects within the beam path, and other unpredictable interference sources.

FIG. 1 illustrates a networking environment 100, according to embodiments of the present disclosure. In FIG. 1, a first Access Point (AP) 110a (generally or collectively, AP 110) and a second AP 110b offer and manage wireless communications sessions for various endpoints 120a-b (generally or collectively, endpoints 120, but may also be referred to as stations (STA), client devices (CD) or user equipment (UE)). In various embodiment, a network controller 150 is in communication with the APs 110 to coordinate network management among the APs 110, although the APs 110 can also manage the network among themselves, thus omitting the network controller 150.

The APs 110 can offer wireless communication sessions according to various Radio Access Technologies and communications standards such as, but not limited to, "Wi-Fi" networking according to the various families, sub-standards, and derivatives of the IEEE 802.11 standard, cellular networking including various generations and subtypes thereof, such as, Long Term Evolution (LTE) and Fifth Generation New Radio (5G NR)) networks, Citizens Broadband Radio Service (CBRS) networks, or the like. Example hardware as may be included in an AP 110 is discussed in greater detail in regard to FIG. 7.

An endpoint 120 may include any computing device that is configured to wirelessly connect to one or more APs 110. Example endpoints 120 can include, but are not limited to: smart phones, feature phones, tablet computers, laptop computers, desktop computers, Internet of Things (IoT) devices, and the like. Example hardware as may be included in an endpoint 120 is discussed in greater detail in regard to FIG. 7.

The network controller 150 may include any computing device or cloud based service that is configured to interface with two or more APs 110 to coordinate how spectrum is shared in the environment 100. The network controller 150 can be provided on a separate computing device connected to the individual APs 110 via wired or wireless communications, may be included with a "central" or "commander" AP 110, or may be provided in an ad hoc arrangement via a collective of two or more APs 110 negotiating among themselves for network management. Example hardware as may be included in a network controller 150 is discussed in greater detail in regard to FIG. 7.

To access the wireless network(s) offered by the APs 110, the endpoints 120 are associated with one or more APs 110. For example, a first endpoint 120a is associated with a first AP 110a, whereas a second endpoint 120b is associated with a second AP 110b, to each receive network communications via the associated AP 110. In various embodiments, which AP 110 a given endpoint 120 is associated with can be based on the signal strengths offered by each AP 110, the number of devices served by each AP 110, the free bandwidth available in the portion of the environment 100 served by the AP 110, previous association status (e.g., a "sticky" connection) of the endpoint 120, and various other metrics.

In FIG. 1, a first omnidirectional range 130a (generally or collectively, omnidirectional range 130) of the first AP 110a is shown overlapping with a second omnidirectional range 130b of the second AP 110b. The omnidirectional ranges 130 of coordinated APs 110 can be purposely set up with an overlapping region 160 to allow for seamless handoff of the association from one AP 110 to another while an endpoint can be potentially in communication with either AP 110. The precise coverage in the environment of the omnidirectional range 130 of a given AP 110 can be based on the transmission power of the AP 110 and any intervening objects that may disrupt signal transmission.

In additional to omnidirectional ranges 130, some APs 110 can include antennas or antenna arrays capable of directional transmission. Directional transmission allows, for an equivalent power to an omnidirectional transmission, more power to be focused in a given direction. For example, the first AP 110a can use a directional antenna to produce a directional coverage range, or a beam-formed range 140 that focuses the transmission energy to a certain area in the environment. Although shown in FIG. 1 with one lobe for the beam-formed range 140, beam-formed signals can direct energy into one or more secondary lobes (not illustrated) with different directions from the primary lobe (illustrated in association with the beam-formed range 140)

In various embodiments, the beam-formed range 140 may extend past the omnidirectional range 130 of the associated AP 110 and interfere with devices located outside of the omnidirectional range 130 or that are otherwise associated with a different AP 110. In FIG. 1, for example, the first endpoint 120 is associated with the first AP 110a is located within the first omnidirectional range 130a and the beam-formed range 140. If the first AP 110a sends transmissions to the first endpoint 120a via beamforming (via the signals with the beam-formed range 140), a second endpoint 120b located outside of the first omnidirectional range 130a, but within the beam-formed range 140 can also receive those signals, thus potentially interfering with or unintentionally interacting with the second endpoint 120b.

To avoid using a beam-formed antenna in a beam-forming arraignment that is pollutive to the endpoints 120 associated with other APs 110, the first AP 110a can coordinate with one or more of the other APs 110, the various endpoints 120, or the network controller 150 to identify when the beam-formed range 140 is potentially pollutive. In various embodiments, in response to identifying that signals from the first AP 110a are pollutive to an endpoint 120 associated with a second AP 110b, the first AP 110a switches to a different beam-forming arrangement, (temporarily) ceases beamforming, or is re-associated with the affected endpoints 120.

Figure 2:
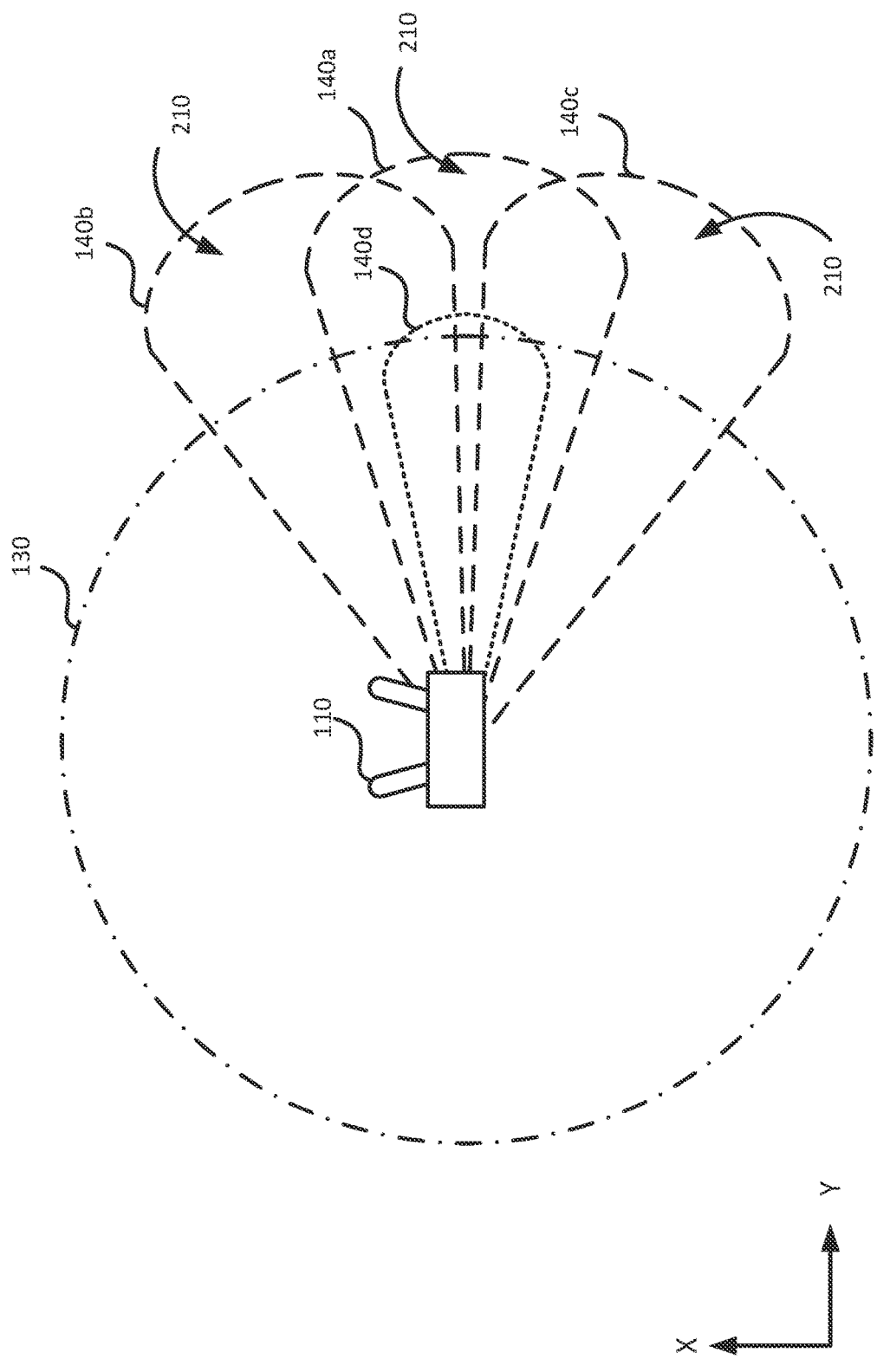
FIG. 2 illustrates a comparison between an omnidirectional range and several beam-formed ranges of an AP, according to embodiments of the present disclosure.

FIG. 2 illustrates a comparison between an omnidirectional range 130 and several beam-formed ranges 140a-d of an AP 110, according to embodiments of the present disclosure. In various embodiments, an AP 110 capable of beamforming can include various antennas than can be set up to produce different beam-formed ranges 140a-d. Additionally or alternatively, an AP 110 can include more than one directional antenna (which may be fixed or steerable) that are configured to produce several different beam-formed ranges 140a-d. In various embodiments, the steerable directional antennas of the AP 110 are physically steered (e.g., by mechanically rotating a directional antenna to point in a given direction) or electrically steered (e.g., via a phased array on antennas applying different phase offset to a signal to produce a desired constructive and destructive interference pattern at the signal generation source).

Each of the illustrated beam-formed ranges 140a-d shown in FIG. 2 are the result of different beamforming arrangements, which can include using different directional antennas, different mechanical settings for rotating a directional antenna, different phase offsets to electrically steer a beam generated by a directional antenna, different transmission power levels, different carrier frequencies, and combinations thereof. Although illustrated in FIG. 2 with four beam-formed ranges 140a-d, in various embodiments, an AP 110 can have more than or fewer than four beamforming arrangements, and thus more or fewer than four beam-formed ranges 140a-d.

For example, the AP 110 can steer the directional antenna in the XY plane (rotating about the Z axis) to the first through third beamforming arrangements to produce the corresponding first through third beam-formed ranges 140a-c. Similarly, the AP 110 can steer the directional antenna from the first beamforming arrangement in the YZ plane (rotating about the X axis) to steer the primary lobe "downward" to produce the fourth beamforming arrangement and the fourth beam-formed range 140d. Additionally or alternatively, the AP 110 can reduce the transmission power of the directional antenna, so that the first beam-formed range 140*a* and the fourth beam-formed range 140*d* are both produced with the same directional antenna steered to the same angle, but with lower transmission power for the fourth beam-formed range 140*d* relative to the first beam-formed range 140*a*.

Because the beamforming arrangements concentrate transmission power into a directional signal, the various beam-formed ranges 140*a-d* can extend past the omnidirectional range of the AP 110. As used herein, the portions of the beam-formed ranges 140*a-d* of a given AP 110 that do not intersect the omnidirectional range 130 of that AP 110 may be referred to as the beam-formed extended coverage range 210 of that AP 110. The relative "overshoot" of the beam-formed ranges 140*a-d* relative to the omnidirectional range 130 can be pollutive to devices outside of the omnidirectional range 130, as these devices may receive signals with sufficiently high Received Signal Strength Indicator (RSSI) value that the devices may attempt to respond to those signals without being an intended recipient.

Depending on the particular beamforming arrangements available for the AP 110 to select between, various beam-formed ranges 140 may partially overlap one another. For example, the first beam-formed range 140*a* completely overlaps the fourth beam-formed range 140*d*, and partially overlaps the second beam-formed range 140*b* and the third beam-formed range 140*c*. In contrast, the second beam-formed range 140*b* is non-overlapping with the third beam-formed range 140*c*, as the coverage ranges thereof do not overlap (outside of a minimum analysis range of X meters or Y % of the omnidirectional range 130). In addition to separating the beam-formed ranges 140*a-d* from overlapping spatially, the AP 110 can use different frequencies for transmission in the different beam-formed ranges 140*a-d* to further avoid sending differentiate the signals and avoid interference or collisions.

Accordingly, if the first beam-formed range 140*a* is used to transmit data from the AP 110 to an endpoint 120 within that range, the AP 110 could potentially use the second through fourth beam-formed ranges 140*b-d* instead to communicate with that endpoint 120. If the first beam-formed range 140*a* is pollutive to endpoints 120 associated with other APs 110, the given AP 110 could therefore potentially continue using the directional antenna and reduce the pollutive effect of the directional antennas by switching to a different one or the second through fourth beam-formed ranges 140*b-d*.

Various environmental factors can affect the overlapping ranges of the various beam-formed ranges 140*a-d* and the omnidirectional range. Therefore, the AP 110 performs various sounding operations to determine the transmission power and steering arrangement in the specific environment where the AP 110 is deployed to account for multi-pathing and various environmental interference sources. However, sounding for one beamforming arrangement does not provide AP 110 with statistical or definitive knowledge about different beamforming arrangements. Accordingly, an endpoint 120 can be assigned to the same channel by the associated AP 110 and receive cross-talk from other endpoints 120 or APs 110 than the associated AP 110.

Figure 3:
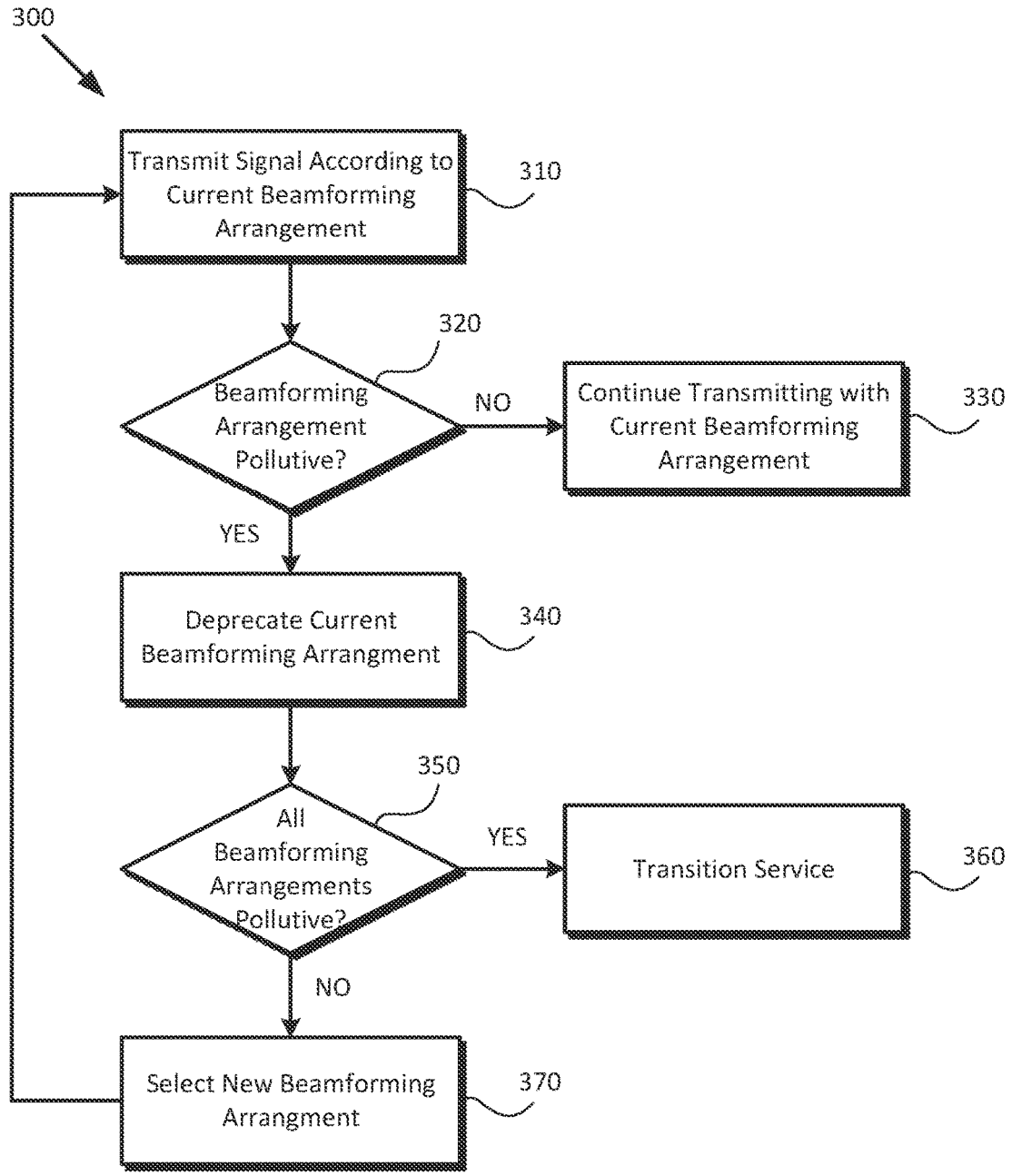
FIG. 3 is a flowchart of a method for managing beamforming arrangements in an AP, according to embodiments of the present disclosure.

FIG. 3 is a flowchart of a method 300 for managing beamforming arrangements in an AP 110, according to embodiments of the present disclosure.

At block 310, a first AP 110*a* transmits a signal to an associated first endpoint 120*a* according to a current beamforming arrangement. In various embodiments, the signal can be a downlink data transmission, a beacon, a sounding request, a station-keeping command, or the like. The current beam-forming arrangement can be associated with a given frequency or channel, a given steering angle for a main lobe of a directional signal, and a given transmission power to thereby produce a corresponding beam-formed range 140.

At block 320, the first AP 110*a* determines (or is informed) whether the current beam-forming arrangement is pollutive to a second endpoint 120*b* associated with a second AP 110*b*. FIGS. 6A-6D illustrate several timing diagrams for determining whether a given beamforming arrangement is pollutive, and greater detail for the determination is provided with respect to FIGS. 6A-6D.

When the current beam-forming arrangement is not determined to be pollutive, method 300 continues to block 330, and the first AP 110*a* can continue transmitting to the first endpoint 120*a* via the current beamforming arrangement and method 300 may conclude. Otherwise, when the current beam-forming arrangement is determined to be pollutive, method 300 proceeds to block 340.

At block 340, the first AP 110*a* deprecates the current beamforming arrangement. In various embodiments, deprecating a beamforming arrangement can include removing the beamforming arrangement from a table of available beamforming arrangements for the first AP 110*a* to select among. Depending on the setup of the table, the first AP 110*a* can remove a combination of a frequency and steering angle from the table or a combination of frequency, steering angle, and transmission power from the table. The deprecation, however, is temporary, and a deprecated beamforming arrangement can be promoted or returned to the table of available beamforming arrangements, as is discussed in greater detail in regard to FIG. 5.

At block 350, the first AP 110*a* determines whether all of the potential beamforming arrangements to communicate with the first endpoint 120*a* have been deprecated. For example, if no beamforming arrangements in the table of available beamforming arrangements have a beam-formed range 140 that includes the area where the first endpoint 120*a* is located, the first AP 110*a* can determine that all of the beamforming arrangements are pollutive. When all of the beamforming arrangements are determined to be pollutive, method 300 proceeds to block 360 to transition service. Otherwise, when not all of the beamforming arrangements are determined to be pollutive, method 300 proceeds to block 370 to select a new beamforming arrangement to test.

At block 360, after determining that all of the potential beamforming arrangements are pollutive, the first AP 110*a* transitions the beamforming service.

In some embodiments, transitioning service includes at least temporarily disabling beam-formed transmissions to the first endpoint 120*a*. Although the first AP 110*a* can continue using beam-formed transmissions with other endpoints 120 associated with the first AP 110*a*, the first AP 110*a* transitions to using omnidirectional signals when communicating with the first endpoint 120*a*. Accordingly, the second endpoint 120*b* is expected to stop receiving pollutive beam-formed signals once service is transitioned to omnidirectional signaling.

In some embodiments, transitioning service includes initiating a handoff of the second endpoint 120*b* from a second AP 110*b* to the first AP 110*a*. Once the second endpoint 120*b* is associated with the first AP 110*a*, the first AP 110*a* can control what channels and times the second endpoint 120*b* is to communicate via. Accordingly, the first AP 110*a* can assigning non-overlapping network resources to the first endpoint 120*a* and to the second endpoint 120*b*. Stated differently, the first AP 110*a* can continue using beam-formed transmissions with the first endpoint 120*a* by shifting the second endpoint 120*b* to a different channel or time band so that the beam-formed transmissions to the first endpoint 120*a* do not cause interference for the second endpoint 120*b*. Additionally or alternatively, the first AP 110*a* (or a network controller 150) can signal the second AP 110*b* to shift the second endpoint 120*b* to a different channel or time band to avoid interference from the beam-formed signals of the first AP 110*a*. The first AP 110*a* can then promote one or more of the previously deprecated beamforming arrangements to use the promoted beamforming arrangements to communicate with the first endpoint 120*a*.

In some embodiments, transitioning service includes overriding interference avoidance, and the first AP 110*a* continues using beam-formed transmissions to communicate with the first endpoint 120*a* without regard (or with less than the initial regard) for the crosstalk caused by beam-formed transmission on the operation of the second endpoint 120*b*. For example, when the AP 110*a* cannot communicate with the first endpoint 120*a* via beam-formed transmission without also causing crosstalk or pollutive signals with the second endpoint 120*b*, but the first endpoint 120*a* has been guaranteed a given level of service that requires beam-formed transmissions (and the first endpoint 120*a* has higher priority in the network compared to the second endpoint 120*b*), the first AP 110*a* can continue using beam-formed transmissions with the first endpoint 120*a* despite the adverse effect on the second endpoint 120*b*. In various embodiments, when transitioning back to using beam-forming despite the adverse effects on a second endpoint 120*b*, the first AP 110*a* can select a beamforming arrangement with a lower adverse effect over beamforming arrangements with higher adverse effects. Overriding interference avoidance can be understood in greater detail in with reference to method 400 discussed in regard to FIG. 4.

At block 370, the first AP 110*a* selects a different beamforming arrangement from the beamforming arrangements previously used to explore whether a different beamforming arrangement can be used to communicate with the first endpoint 120*a* with less pollutive effect on the second endpoint 120*b* while keeping the first endpoint 120*a* within the resultant beam-formed range 140. The first AP 110*a* can select the new beamforming arrangement used to transmit the signal to the first endpoint 120*a* by adjusting one or a combination of the frequency or channel used for transmission, the steering angle for a main lobe of a directional signal, and the transmission power to thereby produce a second beam-formed range 140*b* (or a subsequent beam-formed range 140). After selecting a new beamforming arrangement, method 300 returns to block 310.

When returning to block 310 for a subsequent iteration, the first AP 110*a* transmits a second (or subsequent) signal according to a corresponding second (or subsequent) beamforming arrangement that is different from the previously examined beamforming arrangement(s). In various embodiments, the signal that the first AP 110*a* sends at a subsequent iteration of block 310 to the first endpoint 120*a* can be the same or different from the signal sent in previous iterations of block 310.

When returning to block 320 for a subsequent iteration, the first AP 110*a* determines (or is informed) whether the new beamforming arrangement selected in block 370 is also pollutive to the second endpoint 120*b*. In some embodiments, the first AP 110*a* can determine whether the pollutive effect is greater for the current or a previous beamforming arrangement, and once all (or a threshold number of) potential beamforming arrangements are examined, can transition service (per block 360) to the least pollutive beamforming arrangement.

The least pollutive beamforming arrangement can be the arrangement that results in the fewest endpoints 120 reporting pollutive signals from the first AP 110*a*, or the lowest overall number of pollutive signals received by the affected endpoints 120 (e.g., the second endpoint 120*b* and other endpoints associated with AP 110 other than the first AP 110*a*). In various embodiments, the first AP 110*a* (or the network controller 150) can ignore the pollutive effect, or otherwise prioritize beam-formed transmission for the first endpoint 120*a* over potential interference to a second endpoint 120*b*, when the first endpoint 120*a* has a higher Quality of Service (QoS) level in the network than the second endpoint 120*b*, when the QoS for the first endpoint 120*a* would fall below a service level guarantee if beam-formed transmissions were disabled, or the first endpoint 120*a* otherwise has higher priority to networking resources than the second endpoint 120*b*.

Figure 4:
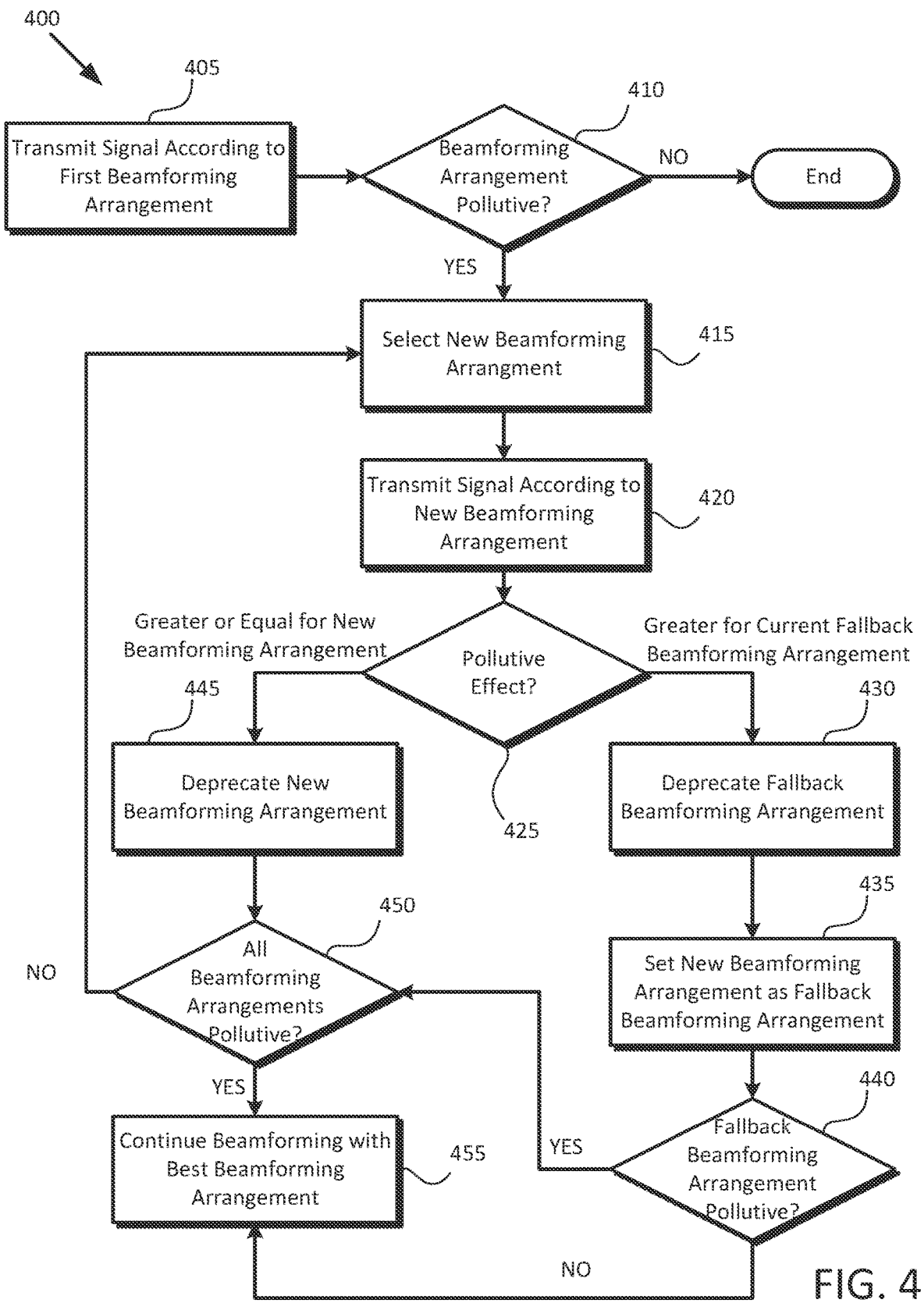
FIG. 4 is a flowchart of a method for managing beamforming arrangements in an AP, according to embodiments of the present disclosure.

FIG. 4 is a flowchart of a method 400 for managing beamforming arrangements in an AP 110, according to embodiments of the present disclosure. Method 400 provides an alternative understanding of the method 300 discussed in relation to FIG. 3, but where the AP 110 overrides interference avoidance schemes to continue using beamforming if no non-pollutive arrangement can be found.

At block 405, a first AP 110*a* transmits a signal to an associated first endpoint 120*a* according to a first beamforming arrangement. In various embodiments, the signal can be a downlink data transmission, a beacon, a sounding request, a station-keeping command, or the like. The first beam-forming arrangement can be associated with a given frequency or channel, a given steering angle for a main lobe of a directional signal, and a given transmission power to thereby produce a first beam-formed range 140*a*.

At block 410, the first AP 110*a* determines (or is informed) whether the first beam-forming arrangement is pollutive to a second endpoint 120*b* associated with a second AP 110*b*. FIGS. 6A-6D illustrate several timing diagrams for determining whether a given beamforming arrangement is pollutive, and greater detail for the determination is provided with respect to FIGS. 6A-6D.

When the first beam-forming arrangement is not determined to be pollutive, method 400, the first AP 110*a* can continue transmitting to the first endpoint 120*a* via the first beamforming arrangement, and method 400 may conclude. Otherwise, when the first beam-forming arrangement is determined to be pollutive, method 400 proceeds to block 415.

At block 415, the first AP 110*a* selects a new and different beamforming arrangement from the beamforming arrangements previously used. The first AP 110*a* selects the new beamforming to explore whether a different beamforming arrangement can be used to communicate with the first endpoint device 120*a* with less pollutive effect on the second endpoint device 120*b* while keeping the first endpoint device 120*a* within the resultant beam-formed range 140. The first AP 110*a* can select the new beamforming arrangement used to transmit the signal to the first endpoint 120*a* by adjusting one or a combination of the frequency or channel used for transmission, the steering angle for a main lobe of a directional signal, and the transmission power to thereby produce a second beam-formed range 140*b* (or a subsequent beam-formed range 140).

At block 420, the first AP 110*a* transmits a second (or subsequent) signal according to a second (or subsequent)

beamforming arrangement as selected in block 415. In various embodiments, the signal that the first AP 110a sends at block 420 to the first endpoint 120a can be the same or different from the signals sent in block 405 or in previous iterations of block 420.

At block 425, the first AP 110a determines whether the pollutive effect of the new beamforming arrangement is greater than the pollutive effect of the of the current fallback (e.g., least pollutive) beamforming arrangement. During a first iteration of block 425, the current fallback beamforming arrangement is the first beamforming arrangement used in block 405, but the first beamforming arrangement can remain the fallback beamforming arrangement if no new beamforming arrangement is identified that has a lower pollutive effect on the second endpoint 120b or additional endpoints 120 in the network environment. When the new beamforming arrangement is identified as less pollutive than the current fallback beamforming arrangement, method 400 proceeds to block 430. When the new beamforming arrangement is not identified as less pollutive than the current fallback beamforming arrangement (e.g., the pollutive effect is greater or equal for the new beamforming arrangement), method 400 proceeds to block 445.

At block 430, the first AP 110a deprecates the current fallback beamforming arrangement. In various embodiments, deprecating a beamforming arrangement can include removing the beamforming arrangement from a table of available beamforming arrangements for the first AP 110a to select among. Depending on the setup of the table, the first AP 110a can remove a combination of a frequency and steering angle from the table or a combination of frequency, steering angle, and transmission power from the table. The deprecation, however, is temporary, and a deprecated beamforming arrangement can be promoted or returned to the table of available beamforming arrangements, as is discussed in greater detail in regard to FIG. 5.

At block 435, the first AP 110a sets the new beamforming arrangement (selected per block 415) as the fallback beamforming arrangement for future analysis and comparison.

At block 440, the first AP 110a determines whether the fallback beamforming arrangement (e.g., the new beamforming arrangement) is pollutive to the second endpoint 120b. When the current fallback beamforming arrangement is pollutive, method 400 proceeds to block 450. Otherwise, when the current fallback beamforming arrangement is not pollutive, method 400 proceed to block 455.

At block 445, the first AP 110a deprecates the new beamforming arrangement selected in the latest iteration of block 415. The current fallback beamforming arrangement therefore remains unaltered in the next iteration of blocks 415-425. In various embodiments, deprecating a beamforming arrangement can include removing the beamforming arrangement from a table of available beamforming arrangements for the first AP 110a to select among. Depending on the setup of the table, the first AP 110a can remove a combination of a frequency and steering angle from the table or a combination of frequency, steering angle, and transmission power from the table. The deprecation, however, is temporary, and a deprecated beamforming arrangement can be promoted or returned to the table of available beamforming arrangements, as is discussed in greater detail in regard to FIG. 5.

At block 450, the first AP 110a determines whether all of the potential beamforming arrangements to communicate with the first endpoint 120a have been deprecated. For example, if no beamforming arrangements in the table of available beamforming arrangements have a beam-formed range 140 that includes the area where the first endpoint 120a is located, the first AP 110a can determine that all of the beamforming arrangements are pollutive. When all of the beamforming arrangements are determined to be pollutive, method 400 proceeds to block 455 to transition service by continuing to use beamforming with the "best", albeit pollutive, fallback beamforming arrangement. Otherwise, when not all of the beamforming arrangements have been examined, method 400 returns to block 415 to select a new beamforming arrangement to test.

At block 455, the first AP 110a continues to use beamforming while communicating with the first endpoint 120a and beamforms using the fallback beamforming arrangement. In various embodiments, the fallback beamforming arrangement can be a beamforming arrangement identified as non-pollutive or the beamforming arrangement that is least pollutive to the various other endpoints 120 in the network environment. For example, when the AP 110a cannot communicate with the first endpoint 120a via beamformed transmission without also causing crosstalk or pollutive signals with the second endpoint 120b, but the first endpoint 120a has been guaranteed a given level of service that requires beam-formed transmissions (and the first endpoint 120a has higher priority in the network compared to the second endpoint 120b), the first AP 110a can continue using beam-formed transmissions with the first endpoint 120a despite the adverse effect on the second endpoint 120b.

The least pollutive beamforming arrangement can be the beamforming arrangement that results in the fewest endpoints 120 reporting pollutive signals from the first AP 110a, or the lowest overall number of pollutive signals received by the affected endpoints 120 (e.g., the second endpoint 120b and other endpoints associated with AP 110 other than the first AP 110a). In various embodiments, the first AP 110a (or the network controller 150) can ignore the pollutive effect, or otherwise prioritize beam-formed transmission for the first endpoint 120a over potential interference to a second endpoint 120b, when the first endpoint 120a has a higher QoS level in the network than the second endpoint 120b, when the QoS for the first endpoint 120a would fall below a service level guarantee if beam-formed transmissions were disabled, or the first endpoint 120a otherwise has higher priority to networking resources than the second endpoint 120b.

Figure 5:
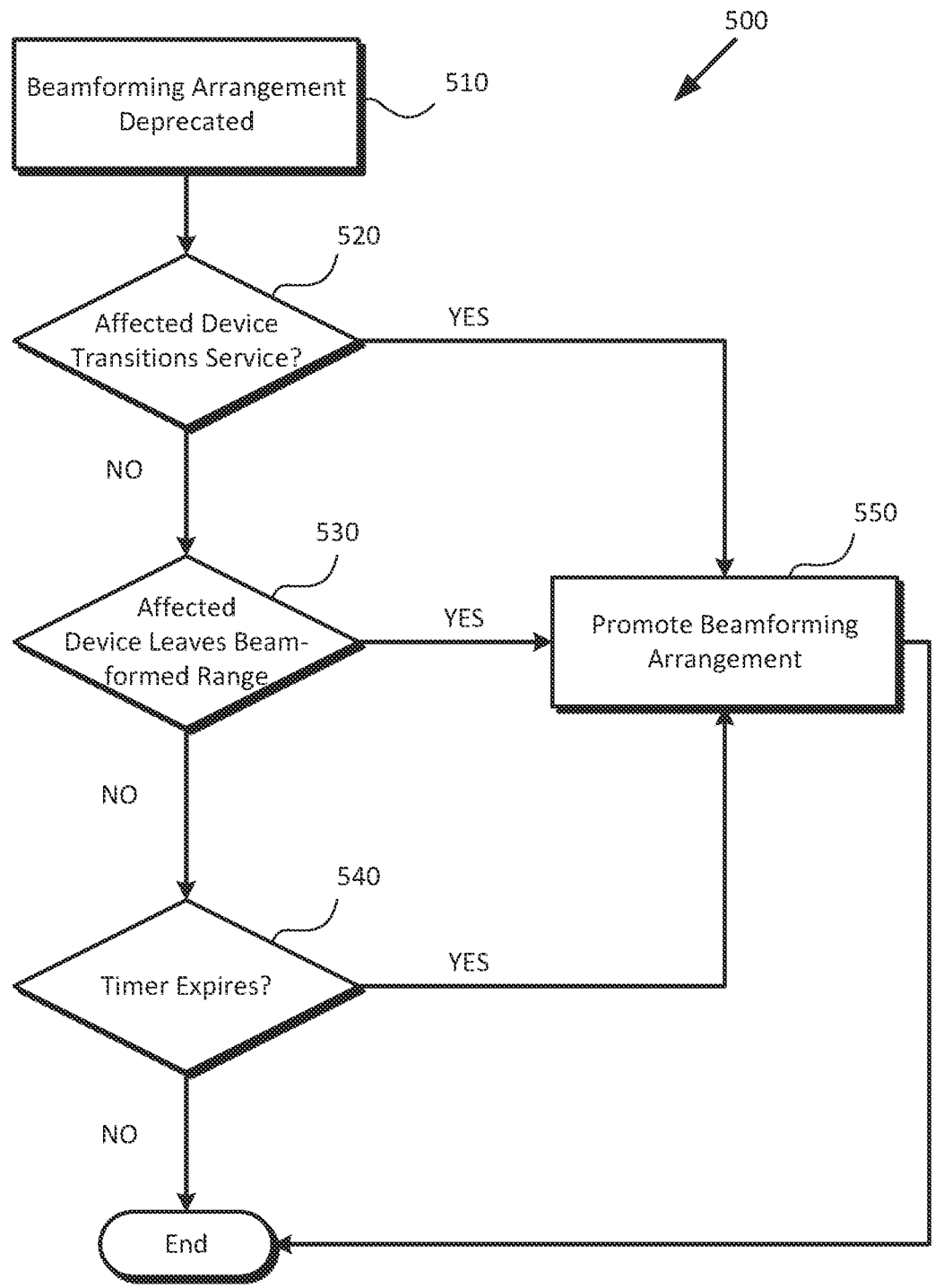
FIG. 5 is a flowchart of a method for managing beamforming deprecation for an AP, according to embodiments of the present disclosure.

FIG. 5 is a flowchart of a method 500 for managing beamforming deprecation for an AP 110, according to embodiments of the present disclosure. Method 500 may be performed in parallel to or in response to method 300 or method 400 designating a beamforming arrangement as pollutive.

Method 500 begins at block 510 in response to an AP 110 designating a beamforming arrangement as pollutive. In various embodiments, when an AP 110 designates a given beamforming arrangement as deprecated, the AP 110 removes that beamforming arrangement from a table or available beamforming arrangements, thus avoiding using a beamforming arrangement so long as that beamforming arrangement remains deprecated. In some embodiments, when an AP 110 designates a given beamforming arrangement as deprecated, the AP 110 reduces a transmission power when transmitting via the first beamforming arrangement. The designated beamforming arrangement remains deprecated, until one or more conditions for removing deprecation are met as indicated in blocks 520-440.

At block 520, the AP 110 determines whether the device affected by the pollutive beamforming arrangement has transitioned service. In various embodiments, an endpoint 120 can transition service by going offline, entering a mode that is non-transmissive and non-receptive for signals (e.g., "airplane" mode), re-associating to be associated with and managed by the AP 110 (e.g., handing off from another AP 110), or change channels or wireless service type. When the endpoint 120 transitions in service type, the endpoint 120 may no longer be affected by pollutive effects from the AP 110 or the AP 110 can manage the endpoint 120 to avoid a pollutive effect when using the beamforming arrangement (e.g., allowing the AP 110 to change the channel that the endpoint 120 uses).

At block 530, the AP 110 determines whether the device affected by the pollutive beamforming arrangement leaves the beam-formed range 140 of the deprecated beamforming arrangement. In various embodiments, the AP 110 can be informed by a second AP 110b or a network controller 150 that the affected endpoint 120 has handed off service to a non-neighboring AP 110 or has otherwise moved out of the beam-formed range 140 of the deprecated beamforming arrangement.

At block 540, the AP 110 determines whether a timer for reinstating the deprecated beamforming arrangement has expired. In various embodiments, when the AP 110 has not determined that the device affected by the pollutive beamforming arrangement has transitioned service (per block 520) or left the beam-formed range 140 of the deprecated beamforming arrangement (per block 530), When all of blocks 520-440 indicate that the affect device can still be affected by the deprecated beamforming arrangement, method 500 may conclude with the beamforming arrangement remaining deprecated, and may be repeated at a later time to reanalyze whether to remove detraction from a given beamforming arrangement. When any of blocks 520-440 indicate that the affected device may no longer be subject to the pollutive effects that originally led to the beamforming arrangement being deprecated (per block 510), method 500 proceeds to block 550.

At block 550, the AP 110 promotes the beamforming arrangement or otherwise removes deprecation from the beamforming arrangement. In various embodiments, the AP 110 promotes the beamforming arraignment by returning the beamforming arrangement to a table of available beamforming arrangements or removes a cap or limit on transmission power to remove the deprecation, thus allowing the AP 110 to use the arrangement again. The beamforming arrangement, however, may be deprecated again (e.g., per method 300 discussed in relation to FIG. 3 or method 400 discussed in relation to FIG. 4) in response to determining that the beamforming arrangement is again pollutive.

FIGS. 6A-6D are timing diagrams for detecting when a beamforming arrangement is pollutive, according to embodiments of the present disclosure. In each of FIGS. 6A-6D, a first AP 110a is associated with a first endpoint 120a, and a second AP 110b is associated with a second endpoint 120b. When the first AP 110a transmits a first signal 610a (generally or collectively, signal 610) to the first endpoint 120a, the first signal 610a continues to the second endpoint 120b as a pollutive signal 620. This pollutive signal 620, or the effects thereof, can be detected by an AP 110, the affected second endpoint 120b, an additional device in the environment (not illustrated), or a network controller 150 in communication with the first AP 110a and second AP 110b.

In various embodiments, although the first signal 610a is transmitted according to a beamforming arrangement, the second signal 610b can be transmitted with or without beamforming by the second AP 110b (e.g., via a directional antenna or an omnidirectional antenna).

Figure 6A:
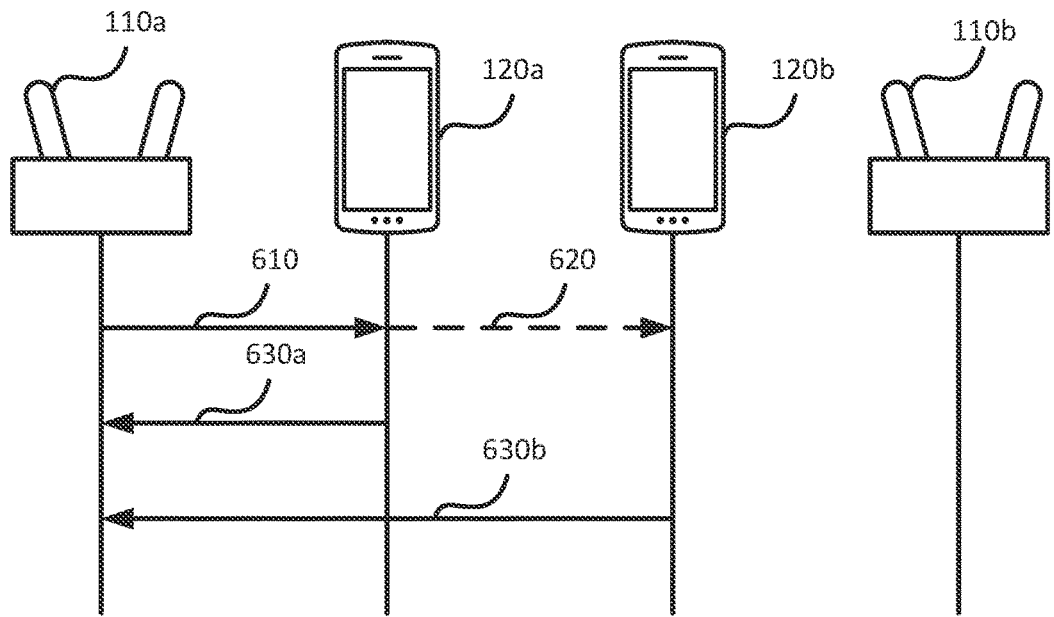
FIGS. 6A-6D are timing diagrams for detecting when a beamforming arrangement is pollutive, according to embodiments of the present disclosure.

In the example shown in FIG. 6A, the current beamforming arrangement for the first AP 110a can be identified as pollutive in response to the first AP 110a receiving a second sounding response 630b (generally or collectively, response 630) from the second endpoint 120b that is responsive to sounding request sent by the first AP 110a as the signal 610. Although the AP 110a expects to receive a first sounding response 630a from the first endpoint 120a that the signal 610 was intended for, the second sounding response 630b is unexpected. When an unexpected sounding response 630 is received, the AP 110 can identify that the current beamforming arrangement identify is pollutive to the endpoint 120 that send the sounding response 630.

Figure 6B:
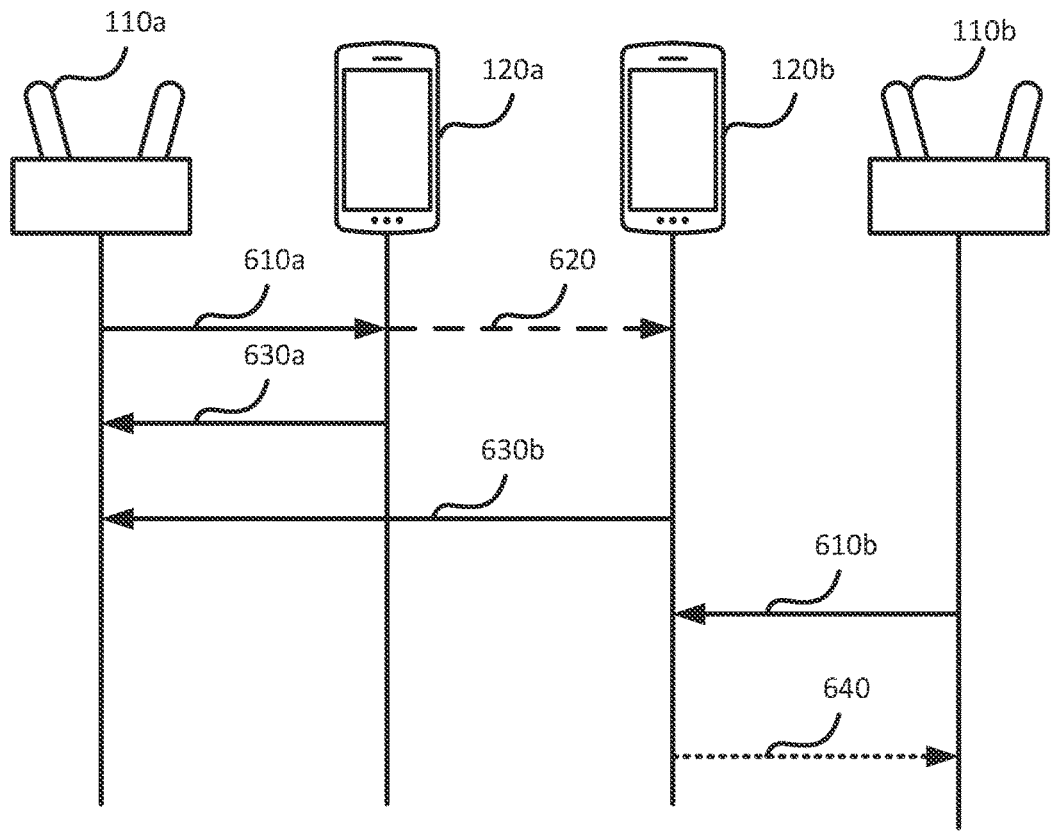

In the example shown in FIG. 6B, the current beamforming arrangement for the first AP 110a is identified as pollutive in response to the second AP 110b identifying that the second endpoint 120b is non-responsive to a sounding request sent by the second AP 110b as the second signal 610b. When the first AP 110a and the second AP 110b send sounding requests at different times or rates, the second endpoint 120b can receive the sounding request from the first AP 110a and respond to the first AP 110a (as in FIG. 6A), but fail to respond to the sounding request from the second AP 110b (e.g., due to a guard period for responding after sending the second sounding response 630b to the first AP 110a). Accordingly, when the second AP 110b does not receive an expected sounding response 640 by a given time after transmitting the second sounding request (e.g., the second signal 610b), the second AP 110b can determine that the second endpoint 120b is experiencing a pollutive effect from another AP 110. In various embodiments, the second AP 110b can coordinate with the neighboring APs 110, a network controller 150, or combinations thereof to alert the other APs 110 of this pollutive effect.

Figure 6C:
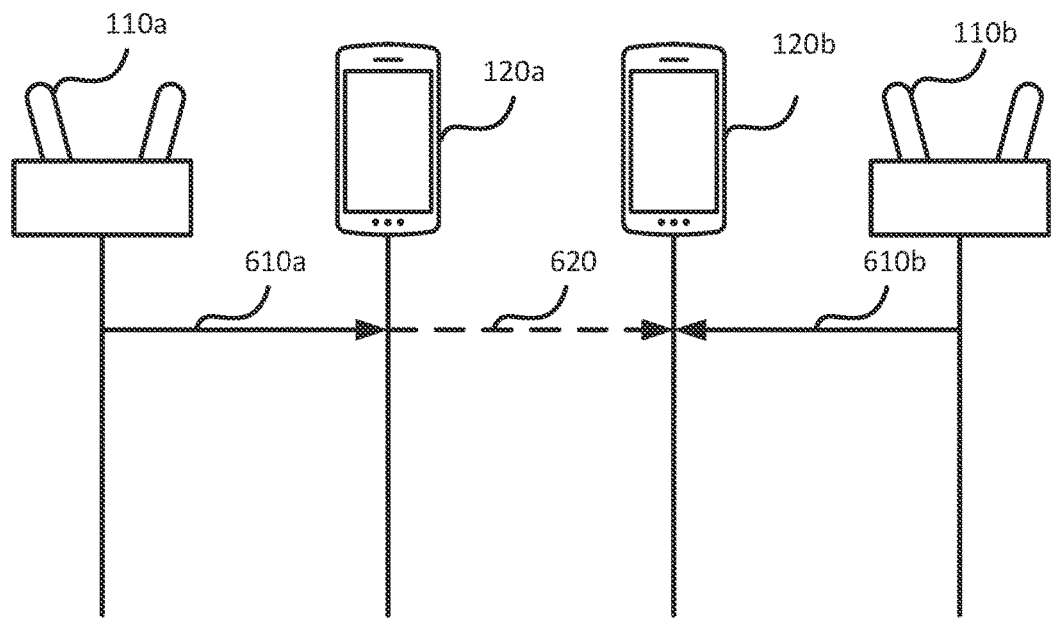

In the example shown in FIG. 6C, the first beamforming arrangement is identified as pollutive in response to device other than the first AP 110a and the second AP 10b (such as the second endpoint 120b or another endpoint 120 or AP 110 acting as an environmental monitor) observing a signal collision from the first signal 610a sent by the first AP 110a and the second signal 610b sent by the second AP 110b. The third device can report the signal collision to an associated AP 110 or to a network controller 150 or combinations thereof to alert the first AP 110a and the second AP 110b of this pollutive effect.

Figure 6D:
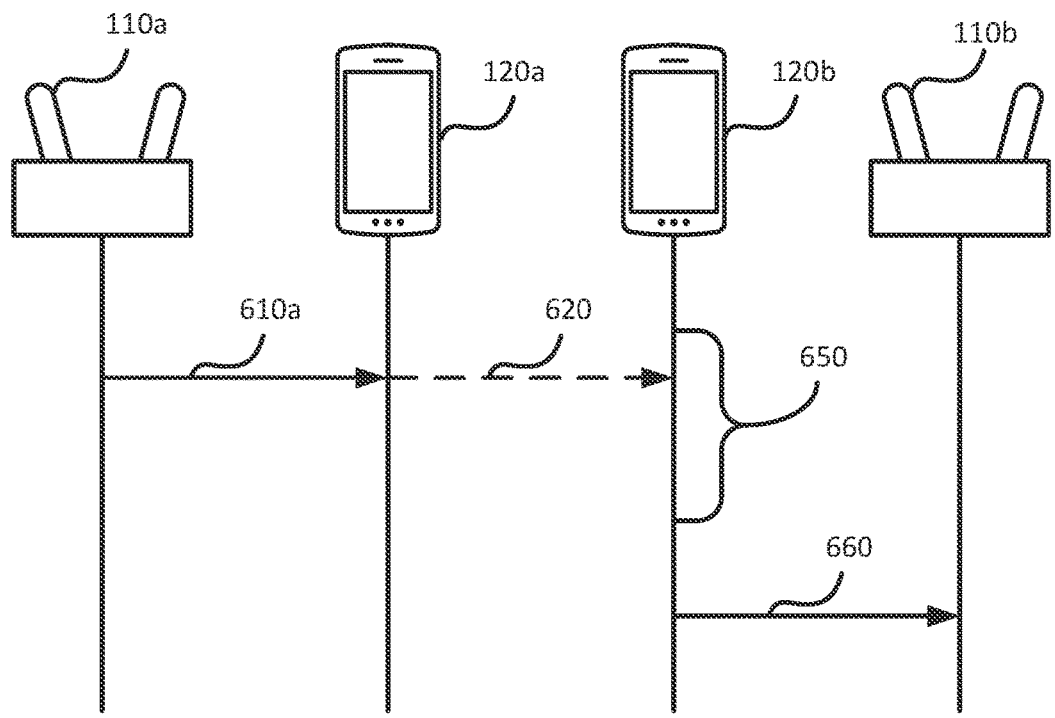

In the example shown in FIG. 6D, the current beamforming arrangement for the first AP 110a is identified as pollutive in response to the second endpoint 120b sending a beacon report 660 to the second AP 110b. Because the second endpoint 120b is associated with the second AP 110b, the second endpoint 120b can periodically send a beacon report 660 that identifies any AP 110 that transmits a beacon signal above a given RSSI threshold. The beacon report 660 can include the time at which any signal is received by the second endpoint 120b during a measured interval 650 (e.g., an observation time period or beacon frame) so that the second AP 110b (or a network controller 150) can identify when the second endpoint 120b detected interference (e.g., the pollutive signal 620). By coordinating with the first AP 110a and a second AP 110b, the network controller 150 can identify that the time at which the interference is detected by the second endpoint 120b corresponds to a transmission time of the first signal 610a from the first AP 110a to the first endpoint 120a when using the first beamforming arrangement. Additionally or alternatively, in some embodiments, the beacon report 660 can identify the sender (e.g., the first AP 110a), the receiver (e.g., the first endpoint 120a), or both of a downlink data frame sent as the first signal 610a to identify the source of the pollutive signal 620 to the network controller 150.

Figure 7:
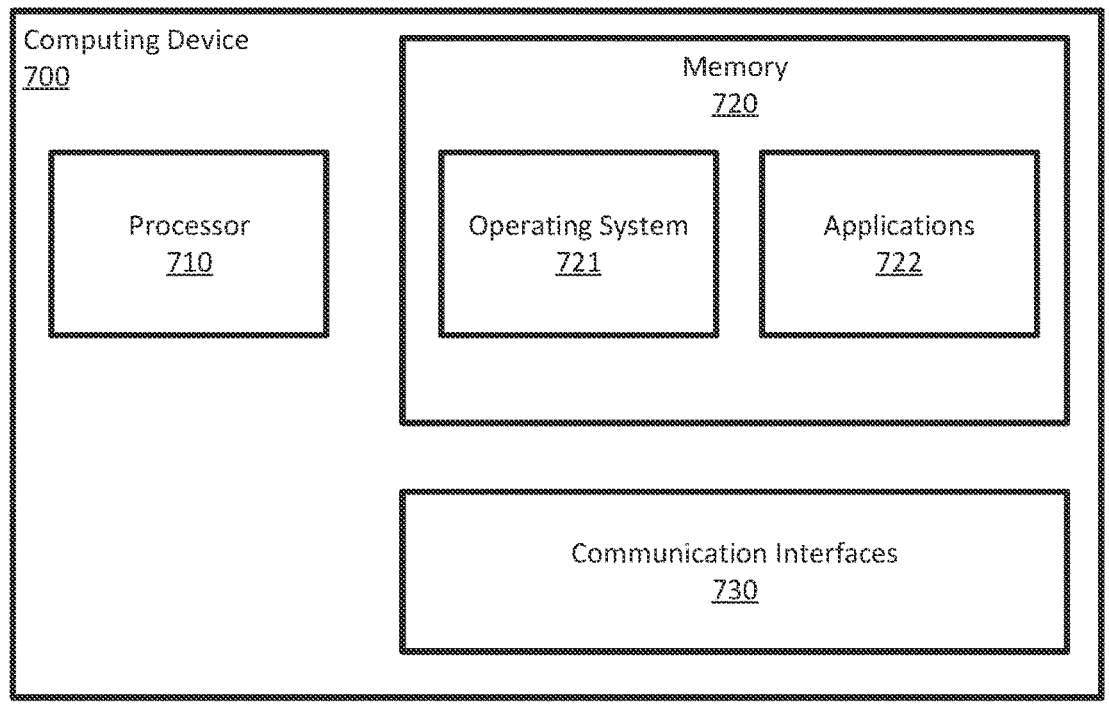
FIG. 7 illustrates hardware of a computing device, according to embodiments of the present disclosure.

FIG. 7 illustrates hardware of a computing device 700 such as can be included in an AP 110, an endpoint 120, or a network controller 150 as described herein. The computing device 700 includes a processor 710, a memory 720, and communication interfaces 730. The processor 710 may be any processing element capable of performing the functions described herein. The processor 710 represents a single processor, multiple processors, a processor with multiple cores, and combinations thereof. The communication interfaces 730 facilitate communications between the computing device 700 and other devices. The communication interfaces 730 are representative of wireless communications antennas (both omnidirectional and directional), various steering mechanisms for the antennas, and various wired communication ports including out-pins and in-pins to a microcontroller. The memory 720 may be either volatile or non-volatile memory and may include RAM, flash, cache, disk drives, and other computer readable memory storage devices. Although shown as a single entity, the memory 720 may be divided into different memory storage elements such as RAM and one or more hard disk drives.

As shown, the memory 720 includes various instructions that are executable by the processor 710 to provide an operating system 721 to manage various functions of the computing device 700 and one or more applications 722 to provide various functionalities to users of the computing device 700, which include one or more of the functions and functionalities described in the present disclosure including detecting pollutive signals and managing beamforming in response to detecting pollutive signals.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   transmitting a first signal from a first Access Point (AP) to a first endpoint associated with the first AP via a first beamforming arrangement;
   in response to identifying that the first beamforming arrangement is pollutive to a second endpoint associated with a second AP, wherein a beam-formed range of the pollutive first beamforming arrangement extends beyond an omnidirectional range of the first AP into an omnidirectional range of the second AP, wherein the second endpoint is outside of the omnidirectional range of the first AP:
      deprecating the first beamforming arrangement by temporarily removing the first beamforming arrangement from a table of available beamforming arrangements at the first AP; and
      transmitting a second signal from the first AP to the first endpoint via a second beamforming arrangement, different from the first beamforming arrangement.

2. The method of claim 1, wherein the first beamforming arrangement is identified as pollutive in response to the first AP receiving a response from the second endpoint responsive to a sounding request sent by the first AP via the first beamforming arrangement.

3. The method of claim 1, wherein the first beamforming arrangement is identified as pollutive in response to the second AP identifying that the second endpoint is non-responsive to a sounding request sent by the second AP, wherein the first AP and the second AP send sounding requests at different rates.

4. The method of claim 1, wherein the first beamforming arrangement is identified as pollutive in response to a third device observing signal collisions from signals sent by the first AP and the second AP.

5. The method of claim 1, wherein the first beamforming arrangement is identified as pollutive in response to the second endpoint sending a beacon report to the second AP that includes a time during a measured interval in which the second endpoint detected an interference; and
   wherein a network controller identifies that the time at which the interference is detected corresponds to a transmission time from the first AP to the first endpoint using the first beamforming arrangement.

6. The method of claim 1, wherein the first beamforming arrangement is identified as pollutive in response to the second endpoint sending a beacon report to the second AP that identifies a sender or a receiver for a downlink data frame received during a beacon frame.

7. The method of claim 1, wherein deprecating the first beamforming arrangement further includes at least one of:
   removing the first beamforming arrangement from the table or available beamforming arrangements for use by the first AP, and using the second beamforming arrangement to transmit data to the first endpoint from the first AP; or
   reducing a transmission power used by the first AP when transmitting via the first beamforming arrangement to the first endpoint.

8. The method of claim 1, wherein the first beamforming arrangement remains deprecated until the second endpoint relocates outside of a beam-formed extended coverage range of the first AP.

9. The method of claim 1, further comprising, in response to identifying that the second beamforming arrangement is pollutive to the second endpoint:
   initiating a handover of the second endpoint from the second AP to the first AP;
   assigning, by the first AP, non-overlapping network resources to the first endpoint and to the second endpoint;
   promoting the first beamforming arrangement; and
   transmitting signals from the first AP to the first endpoint according to the first beamforming arrangement.

10. The method of claim 1, further comprising, in response to the second AP identifying that a third beamforming arrangement used to transmit a third signal to a third endpoint associated with the second AP is pollutive, disabling beamforming for the second endpoint by the first AP and the second AP.

11. The method of claim 1, wherein the first beamforming arrangement is identified as pollutive in response to transmitting the second signal from the first AP to the first endpoint via the second beamforming arrangement and determining that the second beamforming arrangement is less pollutive than the first beamforming arrangement.

12. An access point, comprising:
    a processor; and
    a memory including instructions, that when executed by the processor perform an operation comprising:
       transmitting a first signal to a first endpoint that is associated with the access point via a first beamforming arrangement;
       in response to identifying that the first beamforming arrangement is pollutive to a second endpoint not associated with the access point, wherein a beam-formed range of the pollutive first beamforming arrangement extends beyond an omnidirectional range of the access point into an omnidirectional range of another access point associated with the second endpoint,
          deprecating the first beamforming arrangement by temporarily removing the first beamforming arrangement from a table of available beamforming arrangements at access point; and
          transmitting a second signal from the access point to the first endpoint via a second beamforming arrangement.

13. The access point of claim 12, wherein the first beamforming arrangement is identified as pollutive in response to at least one of:
    the Access Point receiving a response from the second endpoint responsive to a sounding request sent by the Access Point via the first beamforming arrangement;
    a second Access Point associated with the second endpoint identifying that the second endpoint is non-responsive to a sounding request sent by the second Access Point, wherein the Access Point and the second Access Point send sounding requests at different rates;

a third device observing signal collisions from signals sent by the Access Point and the second Access Point; or the second endpoint sending a beacon report to the second Access Point that identifies a sender or a receiver for a downlink data frame received during a beacon frame.

14. The access point of claim 12, wherein deprecating the first beamforming arrangement further includes at least one of:

removing the first beamforming arrangement from the table or available beamforming arrangements for use by the Access Point, and using the second beamforming arrangement to transmit data to the first endpoint from the Access Point; or reducing a transmission power used by the Access Point when transmitting via the first beamforming arrangement to the first endpoint.

15. The access point of claim 12, wherein the operation further comprises, in response to identifying that the second beamforming arrangement is pollutive to the second endpoint transitioning service by:

initiating a handover of the second endpoint from a second access point associated with the second endpoint to the access point;

assigning, by the access point, non-overlapping network resources to the first endpoint and to the second endpoint;

promoting the first beamforming arrangement; and transmitting signals from the Access Point to the first endpoint according to the first beamforming arrangement.

16. A method comprising:

transmitting a first signal from a first Access Point (AP) to a first endpoint associated with the first AP via a first beamforming arrangement;

in response to identifying that the first beamforming arrangement is pollutive to a second endpoint associated with a second AP, wherein a beam-formed range of the pollutive first beamforming arrangement extends beyond an omnidirectional range of the first AP into an omnidirectional range of the second AP, wherein the second endpoint is outside of the omnidirectional range of the first AP:

transmitting a second signal from the first AP to the first endpoint via a second beamforming arrangement; and in response to identifying that a first pollutive effect of the first beamforming arrangement is greater than a second pollutive effect of the second beamforming arrangement, deprecating the first beamforming arrangement by temporarily removing the first beamforming arrangement from a table of available beamforming arrangements at the first AP.

17. The method of claim 16, wherein the first beamforming arrangement is identified as pollutive in response to at least one of:

the first AP receiving a response from the second endpoint responsive to a sounding request sent by the first AP via the first beamforming arrangement;

the second AP identifying that the second endpoint is non-responsive to a sounding request sent by the second AP, wherein the first AP and the second AP send sounding requests at different rates;

a third device observing signal collisions from signals sent by the first AP and the second AP; or the second endpoint sending a beacon report to the second AP that identifies a sender or a receiver for a downlink data frame received during a beacon frame.

18. The method of claim 16, wherein deprecating the first beamforming arrangement further includes at least one of:

removing the first beamforming arrangement from the table or available beamforming arrangements for use by the first AP, and using the second beamforming arrangement to transmit data to the first endpoint from the first AP; or reducing a transmission power used by the first AP when transmitting via the first beamforming arrangement to the first endpoint.

19. The method of claim 16, further comprising, in response to identifying that the second beamforming arrangement is pollutive to the second endpoint transitioning service by:

initiating a handover of the second endpoint from the second AP to the first AP;

assigning, by the first AP, non-overlapping network resources to the first endpoint and to the second endpoint;

promoting the first beamforming arrangement; and transmitting signals from the first AP to the first endpoint according to the first beamforming arrangement.

20. The method of claim 16, further comprising:

in response to identifying that all beamforming arrangements available to the first AP to communicate with the first endpoint are pollutive, continuing to transmit signals from the first AP to the first endpoint via a fallback beamforming arrangement.

* * * * *

UNITED STATES PATENT AND TRADEMARK OFFICE
CERTIFICATE OF CORRECTION

| | |
|---|---|
| PATENT NO. | : 11,923,937 B2 |
| APPLICATION NO. | : 17/332670 |
| DATED | : March 5, 2024 |
| INVENTOR(S) | : Jerome Henry et al. |

Page 1 of 1

It is certified that error appears in the above-identified patent and that said Letters Patent is hereby corrected as shown below:

In the Claims

In Column 16, Line 38, in Claim 12, delete "processor" and insert -- processor, cause the processor to --.

In Column 16, Line 49, in Claim 12, after "endpoint," insert -- wherein the second endpoint is outside of the omnidirectional range of the access point: --.

Signed and Sealed this
Fifth Day of August, 2025

Coke Morgan Stewart
*Acting Director of the United States Patent and Trademark Office*